US012802897B2

(12) United States Patent
Chashiro et al.

(10) Patent No.: US 12,802,897 B2
(45) Date of Patent: Nov. 17, 2026

(54) ELECTROLYTIC CAPACITOR

(71) Applicant: Panasonic Intellectual Property Management Co., Ltd., Osaka (JP)

(72) Inventors: Kenta Chashiro, Osaka Fu (JP); Yuichiro Tsubaki, Kyoto Fu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 219 days.

(21) Appl. No.: 18/852,224

(22) PCT Filed: Mar. 24, 2023

(86) PCT No.: PCT/JP2023/011928
§ 371 (c)(1),
(2) Date: Sep. 27, 2024

(87) PCT Pub. No.: WO2023/190203
PCT Pub. Date: Oct. 5, 2023

(65) Prior Publication Data

US 2025/0218698 A1 Jul. 3, 2025

(30) Foreign Application Priority Data

Mar. 31, 2022 (JP) ................................ 2022-059003

(51) Int. Cl.
*H01G 11/60* (2013.01)
*H01G 11/24* (2013.01)
*H01G 11/56* (2013.01)
*H01G 11/62* (2013.01)

(52) U.S. Cl.
CPC ............. *H01G 11/60* (2013.01); *H01G 11/24* (2013.01); *H01G 11/56* (2013.01); *H01G 11/62* (2013.01)

(58) Field of Classification Search
CPC ........ H01G 9/025; H01G 9/035; H01G 9/145; H01G 9/15; H01G 11/24; H01G 11/56; H01G 11/60; H01G 11/62
See application file for complete search history.

(56) References Cited

U.S. PATENT DOCUMENTS

2018/0233292 A1* 8/2018 Tsubaki ................ H01G 9/035
2020/0203081 A1 6/2020 Saito et al.

FOREIGN PATENT DOCUMENTS

JP S61-007616 A 1/1986
JP S62-001218 A 1/1987
JP H04-080909 A 3/1992
(Continued)

OTHER PUBLICATIONS

International Search Report dated Jun. 13, 2023 issued in International Patent Application No. PCT/JP2023/011928, with English translation.

*Primary Examiner* — Nathan Milakovich
(74) *Attorney, Agent, or Firm* — Rimon P.C.

(57) ABSTRACT

An electrolytic capacitor includes a capacitor element and a liquid component, wherein the capacitor element includes an anode body having a dielectric layer and a solid electrolyte in contact with the dielectric layer, the liquid component contains a solvent and a solute, the solvent contains a glycol ether as a first component, the glycol ether contains at least one selected from the group consisting of monoalkyl ether and dialkyl ether, and the glycol ether has a —$(CH_2O)_n$— structure, where n is an integer of 1 or more.

15 Claims, 2 Drawing Sheets

(56) References Cited

FOREIGN PATENT DOCUMENTS

| | | | |
|---|---|---|---|
| JP | H09-106931 | A | 4/1997 |
| JP | 2017-027992 | A | 2/2017 |
| JP | 2021-150452 | A | 9/2021 |
| WO | 2019/065951 | A1 | 4/2019 |

* cited by examiner

ELECTROLYTIC CAPACITOR

CROSS-REFERENCE TO RELATED APPLICATIONS

This application is the U.S. National Phase under 35 U.S.C. § 371 of International Patent Application No. PCT/JP2023/011928, filed on Mar. 24, 2023, which in turn claims the benefit of Japanese Patent Application No. 2022-059003, filed on Mar. 31, 2022, the entire disclosures of which Applications are incorporated by reference herein.

TECHNICAL FIELD

The present invention relates to an electrolytic capacitor.

BACKGROUND ART

Hybrid electrolytic capacitors having a solid electrolyte and a liquid component are considered to be promising capacitors that are small in size, have large capacity, and have low equivalent series resistance (ESR).

PTL 1 (Japanese Laid-Open Patent Publication No. 2017-27992) proposes that a capacitor element of a solid electrolytic capacitor contains polyethylene glycol and a compound having a chemical structure of $(—CH_2—CH(R)—O—)_n$ (wherein R represents an alkyl group having 1 to 4 carbon atoms, and n represents an integer).

PTL 2 (Japanese Laid-Open Patent Publication No. Sho 62-1218 proposes an electrolyte solution for electrolytic capacitor in which an organic carboxylate is dissolved in a mixed solvent containing γ-butyrolactone and glycol ether or diglycol ether.

CITATION LIST

Patent Literatures

PTL 1: Japanese Laid-Open Patent Publication No. 2017-27992

PTL 2: Japanese Laid-Open Patent Publication No. Sho 62-1218

SUMMARY OF INVENTION

Technical Problem

Electrolytic capacitors are used in a variety of temperature environments. On the other hand, liquid components are susceptible to temperature changes. It is particularly important to maintain the low-temperature characteristics of electrolytic capacitors. There is a demand for electrolytic capacitors that can maintain their electrostatic capacitance even at low temperatures (for example, −50° C. or lower).

Solution to Problem

An aspect of the present invention relates to an electrolytic capacitor including a capacitor element and a liquid component, wherein the capacitor element includes an anode body having a dielectric layer and a solid electrolyte in contact with the dielectric layer, the liquid component contains a solvent and a solute, the solvent contains a glycol ether as a first component, the glycol ether contains at least one selected from the group consisting of monoalkyl ether and dialkyl ether, and the glycol ether has a $—(CH_2O)_n—$ structure, where n is an integer of 1 or more.

Advantageous Effects of Invention

According to the present disclosure, it is possible to provide an electrolytic capacitor that includes a liquid component capable of maintaining favorable electrostatic capacitance even at low temperatures.

Novel features of the present invention are set forth in the appended claims, but the present invention, both in terms of structure and content, together with other objects and features of the present invention, will be better understood from the following detailed description taken in conjunction with the drawings.

DESCRIPTION OF EMBODIMENTS

Figure 1:
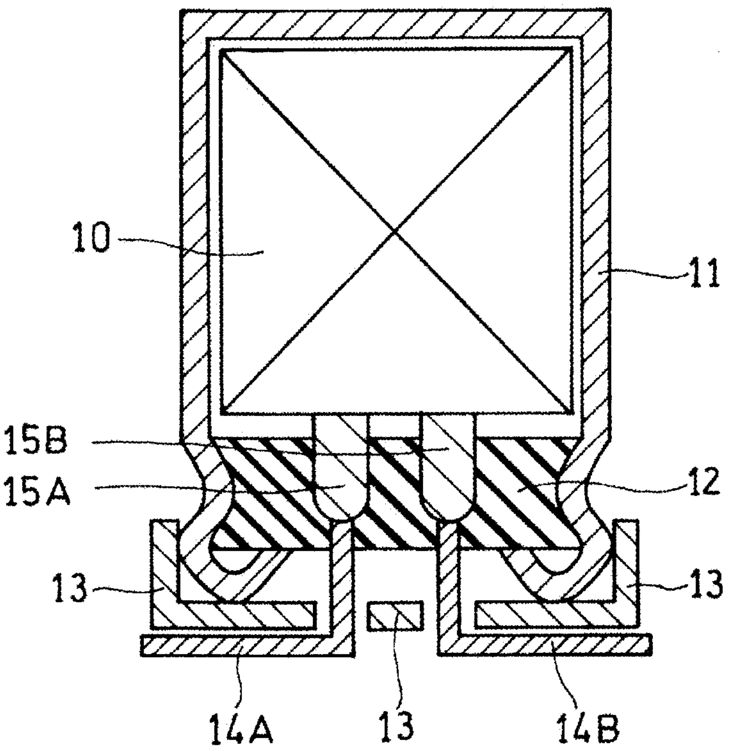
FIG. 1 A schematic cross-sectional view of an electrolytic capacitor according to an embodiment of the present invention.

Hereinafter, electrolytic capacitors according to embodiments of the present disclosure will be described, but the electrolytic capacitors according to the present disclosure are not limited to the following embodiments described below. In the following description, specific numerical values and materials will be exemplified, but other numerical values and other materials may be applied as long as the advantageous effects of the present disclosure can be obtained. The description "numerical value A to numerical value B" herein includes numerical value A and numerical value B, and can also be read as "numerical value A or more and numerical value B or less".

In the following description, when lower limits and upper limits of numerical values related to specific physical properties or conditions are exemplified, any of the exemplified lower limits and any of the exemplified upper limits can be combined as desired, as long as the lower limit is not equal to or greater than the upper limit. When a plurality of materials are exemplified, one of them may be selected and used alone, or two or more of them may be used in combination.

In the following description, the terms "containing" or "including" are expressions that encompass "containing (or including)", "consisting essentially of" and "consisting of".

In the following description, the term "electrolytic capacitor" may also be read as "solid electrolytic capacitor" or "hybrid electrolytic capacitor". The term "capacitor" may also be read as "condenser". The term "liquid component" may be also read as "electrolyte solution".

An electrolytic capacitor according to an embodiment of the present invention includes a capacitor element and a liquid component. The capacitor element includes an anode body having a dielectric layer. The form of the anode body is not particularly limited. The anode body may be formed of a metal foil or a porous metal sintered body, for example. The surface layer of the metal foil may have a porous part. For example, the surface layer of the metal foil may be roughened by etching. The capacitor element may have a cathode part.

The cathode part includes a solid electrolyte in contact with the dielectric layer, for example. The solid electrolyte may be a conductive polymer, a conductive inorganic material (such as manganese dioxide), a TCNQ complex salt, or the like.

The liquid component contains a solvent and a solute. The solvent contains a glycol ether as a first component. The glycol ether contains at least one selected from the group consisting of monoalkyl ethers and dialkyl ethers (hereinafter also referred to as "glycol ether (G)"). In addition, the glycol ether (G) has a —$(CH_2O)_n$— structure, where n is an integer of 1 or more.

That is, a monoalkyl ether has an alkyl group at one end and an OH group at the other end, and has a main structural group between the alkyl group and the OH group. A dialkyl ether has alkyl groups at both ends, and has a main structural group between the two alkyl groups. The main structural group has an oxyethylene group or a polyoxyethylene group.

A monoalkyl ether has a structure represented by R—$(CH_2O)_n$—OH, for example. A dialkyl ether has a structure represented by R—$(CH_2O)_n$—R, for example. The two R's in a dialkyl ether molecule may be the same or different. The glycol ether (G) may be a mixture of a plurality of types of molecules having different n's or different R's.

Unlike glycol compounds having two OH groups, the glycol ether (G) has only one OH group or has no OH groups at all. Therefore, the glycol ether (G) is less susceptible to temperature changes than glycol compounds. Using a liquid component containing the glycol ether (G) makes it possible to obtain an electrolytic capacitor that can maintain a favorable electrostatic capacitance even at low temperatures, for example, below −50° C.

The glycol ether (G) is desirably in a liquid state at room temperature (25° C.) and desirably has a melting point of at least 0° C. or lower.

In addition, using the glycol ether (G) makes it easier to keep low ESR and dielectric loss tangent (tan δ) at low temperatures, for example, −50° C. or less. This is considered to be related to the ability to maintain favorable ionic conductivity of the liquid component at low temperatures. That is, it is considered that using the glycol ether (G) generally improves the low-temperature characteristics of the electrolytic capacitor at −50° C. or less, for example.

The main structural group of the glycol ether (G) may be constituted of only an oxyethylene group or a polyoxyethylene group, but may have an oxyalkylene group other than an oxyethylene group. However, 60% by mass or more, or even 80% by mass or more (may be 100%) of the main structural group is constituted of an oxyethylene group or a polyoxyethylene group. The oxyethylene group is considered to be advantageous for improving low-temperature characteristics in that it contributes to improving ionic conductivity more than other oxyalkylene groups and has lower volatility. It is considered that the higher the ratio of oxygen to carbon in the main structural group, the higher the ionic conductivity, which is advantageous for increasing capacity.

The glycol ether (G) has a lower probability of forming hydrogen bonds and is less likely to promote esterification reactions than glycol compounds. Therefore, the glycol ether (G) is considered as less susceptible to temperature changes than glycol compounds. In particular, the formation of hydrogen bonds is considered as a factor that increases the viscosity of the liquid component at low temperatures and reduces the ionic conductivity of the liquid component.

Dialkyl ethers having no OH groups are considered as less susceptible to temperature changes than monoalkyl ethers having one OH group. On the other hand, monoalkyl ethers having one OH group are less likely to permeate through the sealing member than dialkyl ethers, and therefore are considered as having the effect of significantly suppressing the evaporation of the liquid component of the electrolytic capacitor. From the viewpoint of obtaining more favorable low-temperature characteristics, the content of dialkyl ether in the glycol ether (G) desirably exceeds 50% by mass, and may be 90% by mass or more. From the viewpoint of obtaining favorable low-temperature characteristics and suppressing the evaporation of the liquid component, the content of monoalkyl ether in the glycol ether (G) may be 10% by mass or more, or even 20% by mass or more.

In the structure —$(CH_2O)_n$—, n may be 1 or more, but the average value of n may be 3 or more, may be 4 or more, or may be 5 or more, for example. The average value of n may be 20 or less, may be 15 or less, or may be 10 or less, for example. If the value of n is within such a range, the viscosity of the liquid component containing the glycol ether (G) can be kept lower. In addition, the liquid component can maintain more favorable ionic conductivity. In particular, 90% by mass or more of the glycol ether desirably has an integer n in the range of 1 or more and 11 or less.

The alkyl group of the glycol ether (G) (for example, the R group of R—$(CH_2O)_n$—OH and R—$(CH_2O)_n$—R) is desirably a C1-C10 alkyl group having 1 or more and 10 or less carbon atoms in order to ensure a favorable ionic conductivity. The term "Cn1-Cn2 alkyl group" is a general term for alkyl groups having n1 carbon atoms (n1 is an integer) to n2 carbon atoms (n2 is an integer greater than n1). For example, "C1-C3 alkyl group" refers to at least one selected from the group consisting of a methyl group, an ethyl group, an n-propyl group, and an iso-propyl group. The alkyl group (R) may be a C1-C5 alkyl group or a C1-C3 alkyl group.

In the glycol ether (G), 90 mol % or more of the alkyl groups may be C1-C10 alkyl groups. For example, when the content of the glycol ether (G) in the liquid component of a certain electrolytic capacitor is x 1 mol, y mol % of the glycol ether (G) is a dialkyl ether, and (100−y) mol % is a monoalkyl ether, the liquid component contains (2×x1×y/100)+ (x1×(100−y)/100) mol of alkyl groups. In that case, 0.9×{(2××x1×y/100)+ (x1×(100−y)/100)} mol or more of the alkyl groups may be C1-C10 alkyl groups, may be C1-C5 alkyl groups, or may be C1-C3 alkyl groups.

Similarly, 90 mol % or more of the alkyl groups of the monoalkyl ether in the glycol ether (G) may be C1-C10 alkyl groups, may be C1-C5 alkyl groups, or may be C1-C3 alkyl groups.

Similarly, 90 mol % or more of the alkyl groups of the dialkyl ether may independently be C1-C10 alkyl groups, may be C1-C5 alkyl groups, or may be C1-C3 alkyl groups.

The number-average molecular weight Mn of the glycol ether (G) may be 100 or more, may be 150 or more, or may be 200 or more, for example. The number-average molecular weight Mn may be 4000 or less, may be 2000 or less, or may be 1000 or less, for example. If the number-average molecular weight Mn is within such a range, the viscosity of the liquid component containing the glycol ether (G) can be kept lower. In addition, the liquid component can maintain more favorable ionic conductivity. In particular, the number-average molecular weight of the glycol ether is desirably 100 or more and 1000 or less.

As the solvent, only the glycol ether (G) may be used, or a component other than the glycol ether (G) may be used. However, from the viewpoint of obtaining a more favorable electrostatic capacitance at a low temperature of −50° C. or less, the content of the glycol ether (G) in the liquid component may be 10% by mass or more, may be 15% by mass or more, or may be 20% by mass or more. The content of the glycol ether (G) in the liquid component may be 95% by mass or less, may be 90% by mass or less, or may be 70% by mass or less.

The solvent desirably contains at least one selected from the group consisting of ethylene glycol and sulfolane as a component other than the glycol ether (G) (hereinafter, also referred to as "second component").

Ethylene glycol is unlikely to permeate through the sealing member even at high temperatures, and is therefore considered as having the effect of suppressing the evaporation of the liquid component in the electrolytic capacitor. In addition, when a conductive polymer is used as the solid electrolyte, ethylene glycol is considered as having the effect of improving the crystallinity of the conductive polymer and increasing the electrical conductivity. Furthermore, ethylene glycol has excellent thermal conductivity and excellent heat dissipation properties even with generation of a ripple current.

Sulfolane is stable at high temperatures and can contribute to lowering the viscosity of the liquid component. Sulfolane can solidify at low temperatures, but when it is used in combination with the glycol ether (G), it is possible to suppress such a phenomenon while gaining the benefits of sulfolane.

The content of the second component in the liquid component may be 5% by mass or more, or may be 20% by mass or more, for example. The content of the second component in the liquid component may be 90% by mass or less, or may be 60% by mass or less, for example.

The solvent may further contain γ-butyrolactone as a component other than the glycol ether (G) (hereinafter, also referred to as "third component"). The third component γ-butyrolactone is stable over a wide temperature range and has a low viscosity. The content of the third component in the liquid component may be 5% by mass or more, or may be 20% by mass or more, for example. The content of the third component in the liquid component may be 70% by mass or less, or may be 50% by mass or less, for example.

The solvent may contain a fourth component in addition to the above-described components. However, the content of the fourth component in the liquid component is desirably limited to 20% by mass or less. Examples of the fourth component include glycol compounds other than ethylene glycol, sulfone compounds other than sulfolane, lactone compounds other than γ-butyrolactone, and carbonate compounds. Examples of the glycol compounds include propylene glycol, trimethylene glycol, 1,4-butanediol, pentanediol, and hexanediol. Examples of the sulfone compounds include chain sulfones (dimethyl sulfone, diethyl sulfone, and the like), and cyclic sulfones (3-methyl sulfolane, 3,4-dimethyl sulfolane, 3,4-diphenylmethyl sulfolane, and the like). Examples of the lactone compounds include γ-valerolactone. Examples of the carbonate compounds include dimethyl carbonate, diethyl carbonate, ethyl methyl carbonate, ethylene carbonate, propylene carbonate, and fluoroethylene carbonate. One type of the fourth component may be used alone or two or more types may be used in combination.

In using the first component and the second component in combination, it is desirable to use them in consideration of their proportion so that each component can exhibit the above-described characteristics. For example, the mass of the first component may be 0.1 or more and 5 or less times or 0.2 or more and 2 or less times the mass of the second component. Controlling the mass ratio between the first component and the second component makes it possible to improve the low-temperature characteristics more significantly and in a well-balanced manner.

Examples of preferred compositions of the solvent in the liquid component include the following:

(i) A solvent in which 90% by mass or more of the glycol ether (G) is a dialkyl ether.

(ii) A solvent in which 90% by mass or more of the dialkyl ether in the glycol ether (G) is a polyethylene glycol dialkyl ether.

(iii) A solvent in which 90% by mass or more of the dialkyl ether in the glycol ether (G) is a polyethylene glycol dialkyl ether, and 90 mol % or more of the alkyl groups in the polyethylene glycol dialkyl ether are C1-C10 alkyl groups, C1-C5 alkyl groups, or C1-C3 alkyl groups.

(iv) A solvent in which 90% by mass or more of the glycol ether (G) is at least one selected from the group consisting of ethylene glycol monomethyl ether, diethylene glycol monomethyl ether, triethylene glycol monomethyl ether, tetraethylene glycol monomethyl ether, pentaethylene glycol monomethyl ether, hexaethylene glycol monomethyl ether, heptaethylene glycol monomethyl ether, octaethylene glycol monomethyl ether, nonaethylene glycol monomethyl ether, dodecaethylene glycol monomethyl ether, polyethylene glycol monomethyl ether 400, polyethylene glycol monomethyl ether 550, polyethylene glycol monomethyl ether 1000, polyethylene glycol monomethyl ether 2000, polyethylene glycol monomethyl ether 4000, ethylene glycol dimethyl ether, diethylene glycol dimethyl ether, triethylene glycol dimethyl ether, tetraethylene glycol dimethyl ether, polyethylene glycol dimethyl ether 240, ethylene glycol monoethyl ether, diethylene glycol monoethyl ether, triethylene glycol monoethyl ether, ethylene glycol diethyl ether, diethylene glycol diethyl ether, ethylene glycol monopropyl ether, ethylene glycol monobutyl ether, diethylene glycol monobutyl ether, triethylene glycol monobutyl ether, ethylene glycol dibutyl ether, diethylene glycol dibutyl ether, ethylene glycol monohexyl ether, and diethylene glycol monohexyl ether.

(v) A solvent in which 90% by mass or more of the glycol ether (G) is at least one selected from the group consisting of polyethylene glycol monomethyl ether 400, polyethylene glycol monomethyl ether 550, polyethylene glycol monomethyl ether 1000, polyethylene glycol monomethyl ether 2000, polyethylene glycol monomethyl ether 4000, polyethylene glycol dimethyl ether 200, polyethylene glycol dimethyl ether 240, polyethylene glycol dimethyl ether 400, polyethylene glycol dimethyl ether 550, polyethylene glycol dimethyl ether 1000, polyethylene glycol dimethyl ether 2000, and polyethylene glycol dimethyl ether 4000.

The numerical value of "Mn" in "polyethylene glycol monomethyl ether Mn" or "polyethylene glycol dimethyl ether Mn" indicates an index of number-average molecular weight. Mn refers to a numerical range of Mn×0.8 or more and Mn×1.2 or less. For example, "polyethylene glycol dimethyl ether 400" means polyethylene glycol dimethyl ether having a number-average molecular weight of 320 to 480.

Mn indicates a number-average molecular weight calculated in terms of polystyrene, which is calculated using gel permeation chromatography.

The solute contains an acid component and a base component. As the solute, a salt of an acid component and a base component (electrolyte salt) may be used. The electrolyte salt is at least partially dissociated in the liquid component to generate cations and anions. When the solute includes an acid component and a base component, the degree of dissociation of ions increases, so that the repairability of the dielectric layer can be improved. In preparing the liquid component, an electrolyte salt may be added to the solvent, an acid component and a base component may be added to the solvent, or an electrolyte salt and an acid component and/or a base component may be added to the solvent.

As the acid component, an organic acid is preferable. Examples of the organic acid include an organic carboxylic acid and an anhydride thereof. Examples of the organic acid include an aromatic carboxylic acid, an aliphatic carboxylic acid, an alicyclic carboxylic acid, and the like. Examples of the aromatic carboxylic acid include phthalic acid, isophthalic acid, terephthalic acid, benzoic acid, salicylic acid, trimellitic acid, pyromellitic acid, and the like. Examples of the aliphatic carboxylic acid include maleic acid, adipic acid, and the like. Examples of the alicyclic carboxylic acid include a hydrogenated product of an aromatic carboxylic acid, and the like. From the viewpoint of high repairability and thermal stability of the dielectric layer, phthalic acid is preferable. One type of the acid component may be used alone, or two or more types may be used in combination.

The base component is preferably an organic base. Examples of the organic base include an amine compound, a quaternary amidinium compound, a quaternary ammonium compound, and the like. The amine compound may be any of primary, secondary, and tertiary amines. Examples of the amine compound include an aliphatic amine, an aromatic amine, a heterocyclic amine, and the like. One type of the base component may be used alone, or two or more types may be used in combination.

Specific examples of the amine compound include methylamine, dimethylamine, monoethyldimethylamine, trimethylamine, ethylamine, diethylamine, triethylamine, ethylenediamine, N,N-diisopropylethylamine, tetramethylethylenediamine, hexamethylenediamine, spermidine, spermine, amantadine, aniline, phenethylamine, toluidine, pyrrolidine, piperidine, piperazine, morpholine, imidazole, imidazoline, pyridine, pyridazine, pyrimidine, pyrazine, and 4-dimethylaminopyridine.

The quaternary amidinium compound is preferably a quaternized product of a cyclic amidine compound, and examples thereof include imidazolium compounds and imidazolinium compounds. Examples of the quaternary imidazolium compounds include 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, and 1,3-diethyl-2-methylimidazolium. Examples of the quaternary imidazolinium compounds include 1,3-dimethylimidazolinium, 1,2,3-trimethylimidazolinium, 1-ethyl-3-methylimidazolinium, 1-ethyl-2,3-dimethylimidazolinium, 1,3-diethylimidazolinium, 1,2-diethyl-3-methylimidazolinium, 1,3-diethyl-2-methylimidazolinium, and 1,2,3,4-tetramethylimidazolinium.

As the quaternary ammonium compound, diethyldimethylammonium, monoethyltrimethylammonium, and the like are preferable, for example.

From the viewpoints of suppressing degradation of the solid electrolyte and improving the repairability of the dielectric layer, the molar ratio of the acid component to the base component (=acid component/base component) is preferably 1.1 or more and 10.0 or less.

The concentration of the acid component in the liquid component is preferably 0.1% by mass or more and 30% by mass or less, more preferably 1% by mass or more and 20% by mass or less. The concentration of the base component in the liquid component is preferably 0.1% by mass or more and 20% by mass or less, more preferably 1% by mass or more and 15% by mass or less. In these cases, the repairability of the dielectric layer can be further enhanced.

The present invention will be described in more detail below based on embodiments. However, the present invention is not limited to the following embodiments.

Figure 2:
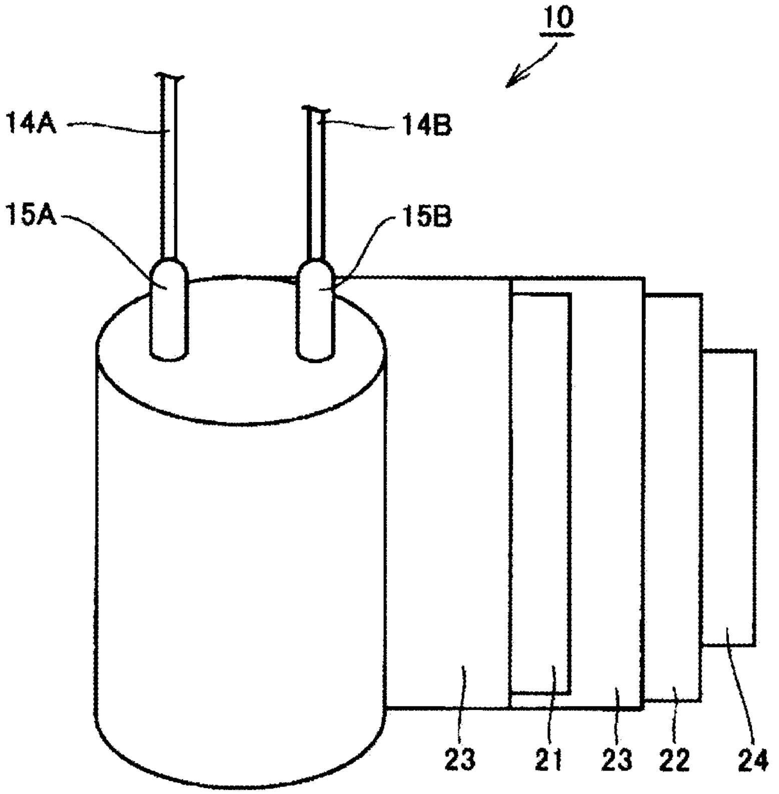
FIG. 2 A schematic diagram illustrating a configuration of a capacitor element according to the same embodiment.

FIG. 1 is a schematic cross-sectional view of an electrolytic capacitor according to the present embodiment, and FIG. 2 is a schematic partially developed view of a part of a capacitor element of the electrolytic capacitor. In the following, a cylindrical electrolytic capacitor will be described as an example, but the shape of the electrolytic capacitor is not particularly limited.

The electrolytic capacitor includes a capacitor element 10, a cylindrical case 11 that stores the capacitor element 10, a sealing member 12 that closes the opening of the case 11, a seat plate 13 that covers the sealing member 12, lead wires 14A and 14B that are led out from a through-hole 12*a* of the sealing member 12 and pass through the seat plate 13, and lead tabs 15A and 15B that connect the lead wires 14A and 14B to electrodes of the capacitor element 10, for example. The vicinity of the opening end of the case 11 is drawn inward, and the opening end is curled so as to be crimped to the sealing member 12.

The capacitor element 10 is fabricated from a wound body as shown in FIG. 2. The wound body includes an anode body 21 connected to the lead tab 15A, a cathode body 22 connected to the lead tab 15B, and a separator 23. The wound body is a semi-finished product in which no solid electrolyte is formed between the anode body 21 and the cathode body 22.

The anode body 21 and the cathode body 22 are wound with the separator 23 interposed therebetween. The outermost periphery of the wound body is fixed with a fixing tape 24. FIG. 2 shows a partially unwound state of the wound body before the outermost periphery is fixed.

The anode body 21 includes a metal foil that is roughened such that the surface has asperities or the surface layer is made porous. A dielectric layer is formed on the metal foil having the asperities or porous part. A solid electrolyte is adhered to at least a portion of the surface of the dielectric layer. The solid electrolyte may coat at least a portion of the surface of the cathode body 22 and/or the surface of the separator 23. The capacitor element 10 on which the solid electrolyte is formed is stored in the case 11 together with a liquid component (not shown).

(Liquid Component)

The liquid component includes a solvent and a solute. The liquid component can be prepared by mixing the constituent components. The liquid component may be any of the liquid components described above.

(Capacitor Element)

The capacitor element 10 includes an anode body having a dielectric layer, a cathode body, and a solid electrolyte in contact with the dielectric layer. The capacitor element 10 usually includes a separator interposed between the anode body and the cathode body.

(Anode Body)

As described above, the anode body may be a metal foil having a roughened surface, for example. The type of the metal constituting the metal foil is not particularly limited, but it is preferable to use a valve metal such as aluminum, tantalum, or niobium, or an alloy containing a valve metal, in terms of ease of forming a dielectric layer.

The surface of the metal foil can be roughened by a known method. By roughening, a plurality of asperities are formed on the surface of the metal foil. The roughening is preferably performed by etching the metal foil, for example. The etching may be performed by DC electrolysis or AC electrolysis, for example.

(Dielectric Layer)

The dielectric layer is formed on the surface of the anode body. Specifically, the dielectric layer is formed on the surface of the roughened metal foil, and therefore is formed along the inner wall surfaces of holes and depressions (pits) on the surface of the anode body.

Although the method for forming the dielectric layer is not particularly limited, the dielectric layer can be formed by subjecting the metal foil to chemical conversion treatment. The chemical conversion treatment may be performed by immersing the metal foil in a chemical conversion solution such as an ammonium adipate solution, for example. In the chemical conversion treatment, a voltage may be applied to the metal foil while it is immersed in the chemical conversion solution, as necessary.

In general, from the viewpoint of mass production, a metal foil made of a large-sized valve metal or the like is subjected to surface roughening treatment and chemical conversion treatment. In this case, the treated foil is cut to a desired size to prepare an anode body having a dielectric layer formed thereon.

(Cathode Body)

A metal foil is used for the cathode body, for example. Although the type of the metal is not particularly limited, it is preferable to use a valve metal such as aluminum, tantalum, or niobium, or an alloy containing a valve metal. The cathode body may be subjected to surface roughening and/or chemical conversion treatment as necessary. The surface roughening and chemical conversion treatment can be performed by the method described above for the anode body, for example.

(Separator)

The separator is not particularly limited, and may be a nonwoven fabric containing fibers of cellulose, polyethylene terephthalate, vinylon, or polyamide (for example, aliphatic polyamide, or aromatic polyamide such as aramid) may be used, for example.

(Solid Electrolyte)

The solid electrolyte includes a conductive polymer, for example. The conductive polymer may be π-conjugated polymer, for example. The conductive polymer may include a π-conjugated polymer and a dopant.

Examples of the π-conjugated polymer include polypyrrole, polythiophene, polyfuran, polyaniline, and derivatives thereof. Derivatives refer to polymers having polypyrrole, polythiophene, polyfuran, polyaniline, or the like as a basic skeleton. For example, polythiophene derivatives include poly(3,4-ethylenedioxythiophene) (PEDOT).

The dopant may be a polymer such as polystyrene sulfonic acid (PSS), or may be naphthalene sulfonic acid, toluene sulfonic acid, or the like.

The conductive polymer may be formed by chemical polymerization and/or electrolytic polymerization of a precursor of a conjugated polymer (monomer, oligomer, or the like) on the dielectric layer, for example. At that time, the precursor of the conjugated polymer may be coexisted with a dopant. A solution in which the conductive polymer (and the dopant) is dissolved or a dispersion liquid in which the conductive polymer (and the dopant) is dispersed may be applied to the dielectric layer and dried to form a solid electrolyte.

Others

The capacitor element 10 can be fabricated by a known method. For example, the capacitor element 10 may be fabricated by laminating an anode body on which a dielectric layer is formed and a cathode body, with a separator interposed therebetween, and then forming a layer of a solid electrolyte between the anode body and the cathode body. The capacitor element 10 may be fabricated by winding the anode body on which a dielectric layer is formed and the cathode body, with a separator interposed therebetween, to form a wound body as shown in FIG. 2, and then forming a layer of a solid electrolyte between the anode body and the cathode body. At the formation of the wound body, the anode body, the cathode body, and the separator may be wound together with the lead tabs 15A and 15B, so that the lead wires 14A and 14B are planted on the wound body as shown in FIG. 2.

Among the anode body, the cathode body, and the separator, the one located on the outermost layer of the wound body (the cathode body 22 in FIG. 2) has an end of the outer surface fixed with a fixing tape. If the anode body is prepared by cutting out from a large-sized metal foil, chemical conversion treatment may be further applied to the capacitor element in the state of the wound body, in order to provide a dielectric layer on the cut surface of the anode body.

The electrolytic capacitor can be manufactured by storing the capacitor element 10 and a prepared liquid component in the case 11 and sealing the opening of the case 11 with the sealing member 12.

EXAMPLES

The present invention will be specifically described below based on examples and comparative examples, but the present invention is not limited to the following examples.

Examples 1 to 8

In these examples, wound electrolytic capacitors (diameter 10 mm×length 10 mm) were fabricated with a rated voltage of 63 V and a rated electrostatic capacitance of 82 μF. The specific manufacturing method of the electrolytic capacitors will be described below.

(Fabrication of Capacitor Element)

An Al foil (anode body) with a roughened surface was chemically treated using an ammonium adipate solution to form a dielectric layer. The obtained anode foil was cut to a predetermined size. Lead tabs were connected to the Al foils as the anode foil and the cathode foil. The anode foil and the cathode foil were wound with a separator interposed therebetween, and the outer surface was fixed with a fixing tape, thereby to prepare a wound body. While the lead tabs and lead wires integrated with the lead tabs were pulled out from the wound body, the anode foil, the cathode foil, and the separator were wound together with the lead tabs. The wound body was chemically treated again using an ammonium adipate solution.

The wound body was immersed in a dispersion that contains polyethylenedioxythiophene (conductive polymer), polystyrenesulfonic acid (dopant), and water stored in a predetermined container for five minutes, and then the wound body was pulled out of the dispersion. Then, the wound body impregnated with the dispersion was dried in a drying oven at 150° C. for 20 minutes to adhere the conductive polymer and the dopant between the anode foil and the cathode foil of the wound body. In this way, the capacitor element was completed and stored in a bottomed cylindrical case with a diameter of 10 mm×a length of 10 mm.

(Impregnation of Liquid Component)

A liquid component was poured into the case, and the capacitor element was impregnated with the liquid component in a reduced pressure atmosphere (40 kPa). As the liquid component, a solution was used in which a triethylamine phthalate salt was dissolved as a solute (electrolyte salt) in a solvent having the composition shown in Table 1. The concentration of the electrolyte salt in the liquid component was standardized to 13% by mass (total of solute (electrolyte salt)+solvent=100%).

(Sealing of Capacitor Element)

The capacitor element impregnated with the liquid component was sealed to complete the electrolytic capacitor. Specifically, the capacitor element was stored in the bottomed case such that the lead wires were located on the opening side of the bottomed case, and a sealing member (elastic material containing butyl rubber as a rubber component) through which the lead wires are to pass through was placed above the capacitor element to seal the capacitor element in the bottomed case. Then, a drawing process was performed in the vicinity of the opening end of the bottomed case, and the opening end was further curled, and a seat plate was placed on the curled portion, thereby to complete an electrolytic capacitor as shown in FIG. 1. After that, the electrolytic capacitor was subjected to an aging process with application of a voltage.

Comparative Example 1

A liquid component was prepared in the same manner as in Example 1, except that polyethylene glycol (Mn: 200) was used instead of glycol ether, and an electrolytic capacitor was assembled.

Comparative Example 2

A liquid component was prepared in the same manner as in Example 1, except that polyethylene glycol (Mn: 400) was used instead of glycol ether, and an electrolytic capacitor was assembled.

Evaluations

Using the electrolytic capacitors obtained in the examples and comparative examples, the capacitance, tan δ, and ESR at 20° C. and −55° C. were measured at 120 Hz, according to the following procedure, and the rates of change were calculated when the value at 20° C. was taken as 100%. Table 2 shows the results. Examples 1 to 8 are indicated as A1 to A8, respectively, and Comparative Examples 1 and 2 are indicated as B1 to B2, respectively. The test was performed on 10 electrolytic capacitors that were randomly selected from 100 fabricated in each example, and the average values were determined.

TABLE 1

| | Electrolyte salt triethylamine phthalate salt (% by mass) | Solvent (% by mass) | | | | | | | |
|---|---|---|---|---|---|---|---|---|---|
| | | EG | SL | PEG200 | PEG400 | PEG MME200 | PEG MME400 | PEG DME200 | PEG DME400 |
| B1 | 13.0 | | | 87.0 | | | | | |
| B2 | 13.0 | | | | 87.0 | | | | |
| A1 | 13.0 | | | | | 87.0 | | | |
| A2 | 13.0 | | | | | | 87.0 | | |
| A3 | 13.0 | | | | | | | 87.0 | |
| A4 | 13.0 | | | | | | | | 87.0 |
| A5 | 13.0 | 29.0 | 29.0 | | | 29.0 | | | |
| A6 | 13.0 | 29.0 | 29.0 | | | | 29.0 | | |
| A7 | 13.0 | 29.0 | 29.0 | | | | | 29.0 | |
| A8 | 13.0 | 29.0 | 29.0 | | | | | | 29.0 |

The meanings of the abbreviations in Tables 1 and 2 are as follows:

EG: ethylene glycol

SL: sulfolane

PEG: polyethylene glycol

MME: monomethyl ether

DME: dimethyl ether

The numbers (200, 300, and 400) following PEG, MME, and DME are number-average molecular weights Cap.: electrostatic capacitance

TABLE 2

| | 120 Hz | | | | | | | | |
|---|---|---|---|---|---|---|---|---|---|
| | 20° C. | | | −55° C. | | | Change rate | | |
| | Cap. (μF) | tanδ | ESR (Ω) | Cap. (μF) | tanδ | ESR (Ω) | ΔCap. | Δtanδ | ΔESR |
| B1 | 80.38 | 0.017 | 0.28 | 54.72 | 0.117 | 3.40 | −31.9% | 606% | 1102% |
| B2 | 80.58 | 0.016 | 0.28 | 45.69 | 0.099 | 3.20 | −43.3% | 509% | 1058% |
| A1 | 80.57 | 0.017 | 0.28 | 59.54 | 0.119 | 3.22 | −26.1% | 598% | 1045% |

TABLE 2-continued

| | 120 Hz | | | | | | | | |
|---|---|---|---|---|---|---|---|---|---|
| | 20° C. | | | −55° C. | | | Change rate | | |
| | Cap. (μF) | tanδ | ESR (Ω) | Cap. (μF) | tanδ | ESR (Ω) | ΔCap. | Δtanδ | ΔESR |
| A2 | 80.77 | 0.017 | 0.27 | 49.71 | 0.101 | 3.03 | −38.5% | 501% | 1003% |
| A3 | 80.83 | 0.017 | 0.27 | 70.99 | 0.065 | 1.21 | −12.2% | 290% | 344% |
| A4 | 81.06 | 0.016 | 0.27 | 71.57 | 0.069 | 1.27 | −11.7% | 320% | 376% |
| A5 | 81.04 | 0.014 | 0.23 | 73.77 | 0.085 | 1.28 | −9.0% | 505% | 458% |
| A6 | 81.24 | 0.014 | 0.22 | 73.95 | 0.071 | 1.20 | −9.0% | 421% | 438% |
| A7 | 81.37 | 0.014 | 0.22 | 75.91 | 0.034 | 0.60 | −6.7% | 149% | 167% |
| A8 | 81.25 | 0.014 | 0.23 | 75.45 | 0.038 | 0.67 | −7.1% | 175% | 196% |

As shown in Tables 1 and 2, in Examples A1 to A8, even at room temperature (20° C.), the electrostatic capacitances tend to be slightly larger than those in Comparative Examples B1 to B2, and the tan δ and ESRs tend to be slightly smaller than those in Comparative Examples B1 to B2. However, the superiority of the examples at room temperature is slight. On the other hand, in Examples A1 to A8, at −55° C., the electrostatic capacitances tend to be significantly larger than those in Comparative Examples B1 to B2, and the tan δ and ESRs tend to be significantly smaller than those in Comparative Examples B1 to B2. In particular, when dialkyl ether is used, the electrostatic capacitances of Examples A1 to A8 at low temperatures increase significantly. In addition, using not only the first component but also the second component in combination further achieves further improvements in electrostatic capacitance. In particular, when dialkyl ether is used as the first component and the second component is also used in combination, low-temperature characteristics are well-balanced.

INDUSTRIAL APPLICABILITY

The electrolytic capacitor according to the present invention has a high capacity even at low temperatures (for example, temperatures of −50° C. or lower) and has excellent low-temperature characteristics, and therefore can be used for a variety of purposes.

Although the present invention has been described with respect to the presently preferred embodiments, such disclosure should not be interpreted as limiting. Various variations and modifications will no doubt become apparent to those skilled in the art to which the present invention pertains upon reading the above disclosure. Therefore, the appended claims should be interpreted to cover all variations and modifications without departing from the true spirit and scope of the present invention.

REFERENCE SIGNS LIST

10: capacitor element, 11: case, 12: sealing member, 13: base plate, 14A, 14B: lead wire, 15A, 15B: lead tab, 21: anode body, 22: cathode body, 23: separator, 24: fixing tape

The invention claimed is:

1. An electrolytic capacitor comprising:

a capacitor element; and a liquid component, wherein the capacitor element includes an anode body having a dielectric layer and a solid electrolyte in contact with the dielectric layer, the liquid component contains a solvent and a solute, the solvent contains a glycol ether as a first component, the glycol ether contains at least one selected from the group consisting of a monoalkyl ether and a dialkyl ether, and the glycol ether has a —$(CH_2O)_n$— structure, where n is an integer of 1 or more.

2. The electrolytic capacitor according to claim 1, wherein a content of the glycol ether in the liquid component is 10% by mass or more.

3. The electrolytic capacitor according to claim 1, wherein 90% by mass or more of the glycol ether has the integer n in a range of 1 or more and 11 or less.

4. The electrolytic capacitor according to claim 1, wherein a number-average molecular weight of the glycol ether is 100 or more and 1000 or less.

5. The electrolytic capacitor according to claim 1, wherein a content of the dialkyl ether in the glycol ether exceeds 50% by mass.

6. The electrolytic capacitor according to claim 1, wherein 90 mol % or more of alkyl groups in the glycol ether are C1-C10 alkyl groups having 1 or more and 10 or less carbon atoms.

7. The electrolytic capacitor according to claim 6, wherein 90 mol % or more of alkyl groups of the monoalkyl ether are the C1-C10 alkyl groups.

8. The electrolytic capacitor according to claim 6, wherein 90 mol % or more of alkyl groups of the dialkyl ether are independently the C1-C10 alkyl groups.

9. The electrolytic capacitor according to claim 1, wherein the content of the glycol ether in the liquid component is 70% by mass or less.

10. The electrolytic capacitor according to claim 1, wherein the solvent further contains at least one selected from the group consisting of ethylene glycol and sulfolane as a second component.

11. The electrolytic capacitor according to claim 10, wherein the solvent further contains γ-butyrolactone as a third component.

12. The electrolytic capacitor according to claim 10, wherein a mass of the first component is 0.1 or more to 5 or less times a mass of the second component.

13. The electrolytic capacitor according to claim 1, wherein the solute contains an acid component and a base component.

14. The electrolytic capacitor according to claim 1, wherein 90% by mass or more of the dialkyl ether is a polyethylene glycol dialkyl ether, and 90 mol % or more of alkyl groups in the polyethylene glycol dialkyl ether are C1-C10 alkyl groups having 1 or more and 10 or less carbon atoms.

15. The electrolytic capacitor according to claim 1, wherein 90% by mass or more of the glycol ether is at least one selected from the group consisting of ethylene glycol monomethyl ether, diethylene glycol monomethyl ether, triethylene glycol monomethyl ether, tetraethylene glycol monomethyl ether, pentaethylene glycol monomethyl ether, hexaethylene glycol monomethyl ether, heptaethylene glycol monomethyl ether, octaethylene glycol monomethyl ether, nonaethylene glycol monomethyl ether, dodecaethylene glycol monomethyl ether, polyethylene glycol monomethyl ether 400, polyethylene glycol monomethyl ether 550, polyethylene glycol monomethyl ether 1000, polyethylene glycol monomethyl ether 2000, polyethylene glycol monomethyl ether 4000, ethylene glycol dimethyl ether, diethylene glycol dimethyl ether, triethylene glycol dimethyl ether, tetraethylene glycol dimethyl ether, polyethylene glycol dimethyl ether 200, polyethylene glycol dimethyl ether 240, polyethylene glycol dimethyl ether 400, polyethylene glycol dimethyl ether 550, polyethylene glycol dimethyl ether 1000, polyethylene glycol dimethyl ether 2000, polyethylene glycol dimethyl ether 4000, ethylene glycol monoethyl ether, diethylene glycol monoethyl ether, triethylene glycol monoethyl ether, ethylene glycol diethyl ether, diethylene glycol diethyl ether, ethylene glycol monopropyl ether, ethylene glycol monobutyl ether, diethylene glycol monobutyl ether, triethylene glycol monobutyl ether, ethylene glycol dibutyl ether, diethylene glycol dibutyl ether, ethylene glycol monohexyl ether, and diethylene glycol monohexyl ether.

* * * * *